M. C. CHAMBERLIN.
Stove Pipe Fastener.
No. 24,100.  Patented May 24, 1859.
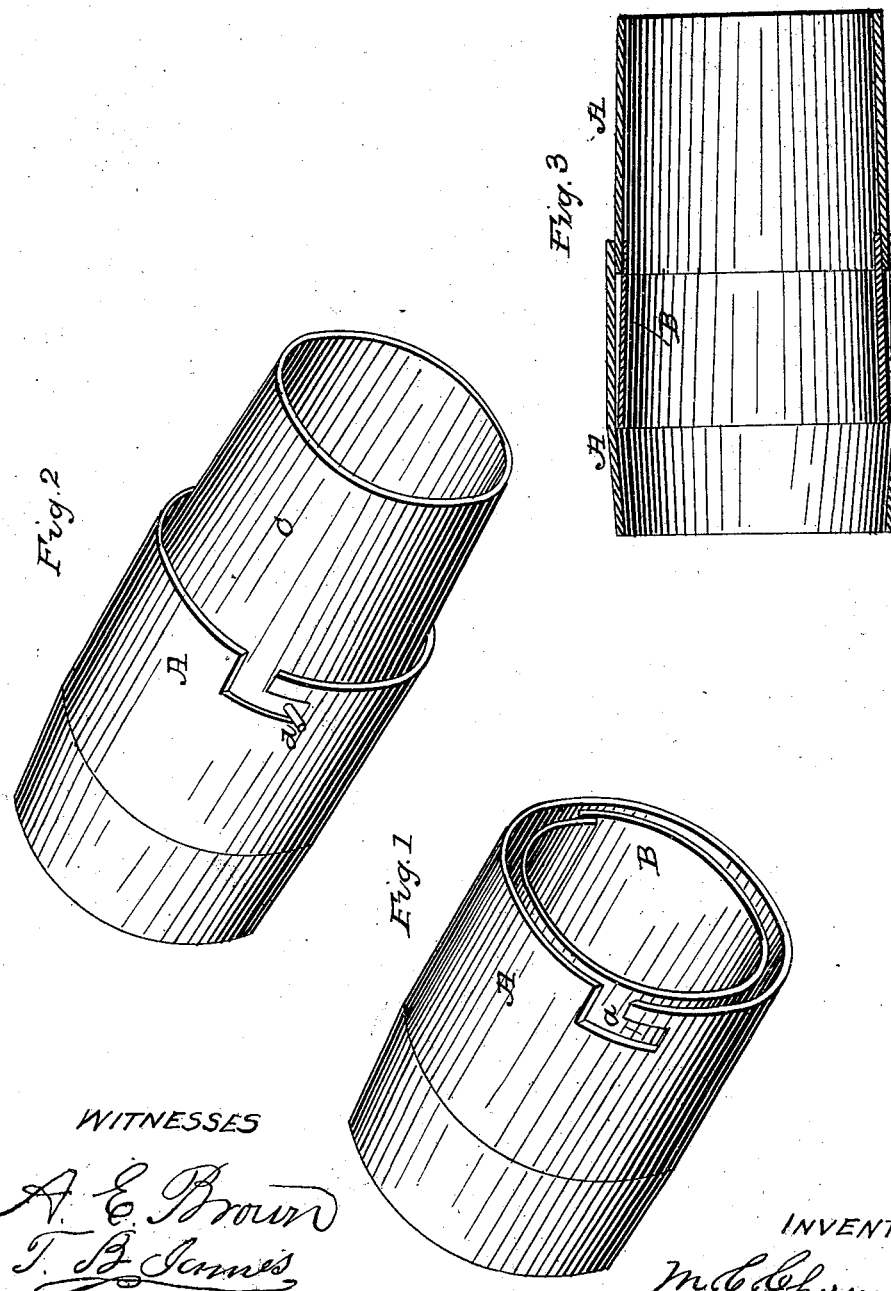
WITNESSES
INVENTOR

UNITED STATES PATENT OFFICE.

M. C. CHAMBERLIN, OF JOHNSONSBURG, NEW YORK.

STOVEPIPE.

Specification of Letters Patent No. 24,100, dated May 24, 1859.

*To all whom it may concern:*

Be it known that I, M. C. CHAMBERLIN, of Johnsonsburg, in the county of Wyoming and State of New York, have invented certain new and useful Improvements in Modes of Connecting Stovepipe-Joints; and I do hereby declare that the following is a full, clear, and exact description of the same, reference being had to the accompanying drawings, making a part of this specification, in which—

Figure 1 is a perspective view of one portion of the pipe containing a spring tube. Fig. 2 is a perspective of the two parts of the pipe secured together. Fig. 3 is a longitudinal section.

In the figures A and A', represent two portions of a stove pipe which are intended to be joined together. That portion of the pipe marked A, is provided with a spring tube B, which is secured in it. Extending in a few inches (three or four) from its mouth—this tube B, is made a little smaller at one end than at the other and is joined at one end and left open at the other, so that it may be allowed to expand and contract when required. That portion marked A is also provided with a slot which is made in its end. The slot runs longitudinally first and then turns at right angles and runs transversely as is shown in the drawings. That portion of the pipe marked A', is provied near its end with a pin *d*.

In the operation of this invention—the two pieces of pipe being brought together, the end of piece A' being made sufficiently small enters the piece A between it and the tube B—the outer portion of tube B, being smaller than the inner portion, it readily enters into pipe A', but as said tube extends in it becomes larger, so that the pipe A' will fit snugly over it. As the pipe A' passes in, the pin *d*, enters the slot *a*, and when it has been pushed in as far as it will go, the pin *d* coming on a line with the transverse portion of the slot *a*, said pipe A' is partially revolved, so that the pin will pass into the transverse portion of the slot, and thus secure the two portions of the pipe together. The tube B presses against the pipe A' on the inside so that no soot or smoke can escape. By means of this arrangement two portions of a stove pipe may be secured together in a moment of time, so that they will be self supporting and so tightly that no smoke or soot can possibly pass out at the joint.

Having thus fully described my invention what I claim as new and desire to secure by Letters Patent is—

1. The employment of the spring tube B, in connection with the pipe A, when the same is used in the manner and for the purpose herein specified.

2. The arrangement of pipe C, provided with pin *d*, with pipe A, provided with slot *a*, and spring tube B, substantially in the manner and for the purpose specified.

M. C. CHAMBERLIN.

Witnesses:
M. P. CASE,
H. L. GLADDING.